United States Patent
Olshansky et al.

(10) Patent No.: US 10,495,732 B2
(45) Date of Patent: Dec. 3, 2019

(54) VEHICLE RADAR METHODS AND SYSTEMS

(71) Applicants: GM GLOBAL TECHNOLOGY OPERATIONS LLC, Detroit, MI (US); Inna Stainvas Olshansky, Modiin (IL); Igal Bilik, Rehovot (IL); Ran Y. Gazit, Ra'Anana (IL)

(72) Inventors: Inna Stainvas Olshansky, Modiin (IL); Igal Bilik, Rehovot (IL); Ran Y. Gazit, Ra'Anana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 377 days.

(21) Appl. No.: 15/524,597

(22) PCT Filed: Jul. 3, 2014

(86) PCT No.: PCT/US2014/045470
§ 371 (c)(1),
(2) Date: May 4, 2017

(87) PCT Pub. No.: WO2016/003473
PCT Pub. Date: Jan. 7, 2016

(65) Prior Publication Data
US 2017/0261602 A1   Sep. 14, 2017

(51) Int. Cl.
*G01S 7/41*   (2006.01)
*G01S 13/86*  (2006.01)
(Continued)

(52) U.S. Cl.
CPC ............ *G01S 7/411* (2013.01); *G01S 13/66* (2013.01); *G01S 13/865* (2013.01);
(Continued)

(58) Field of Classification Search
CPC ................................ G01S 7/411; B60W 30/09
(Continued)

(56) References Cited

U.S. PATENT DOCUMENTS 5,479,173 A * 12/1995 Yoshioka .............. B60T 7/22
                                                    342/70
6,518,916 B1 * 2/2003 Ashihara .............. G01S 7/412
                                                   342/133
(Continued)

FOREIGN PATENT DOCUMENTS

CN    101581780 A    11/2009
CN    102879777 A    1/2013
(Continued)

OTHER PUBLICATIONS

State Intellectual Property Office of the People's Republic of China, Office Action in Chinese Patent Application No. 201510383757.8 dated Mar. 20, 2017.
(Continued)

*Primary Examiner* — Marcus E Windrich
(74) *Attorney, Agent, or Firm* — Lorenz & Kopf, LLP (57) ABSTRACT

Methods and systems are provided for selectively analyzing radar signals of a radar system of a vehicle. A receiver is configured to receive a plurality of radar signals of a radar system of a vehicle. The interface is configured to obtain data from one or more sensors of the vehicle having a modality that is different from the radar system. The processor is coupled to the receiver and to the interface, and is configured to selectively analyze the plurality of radar signals based upon the data.

20 Claims, 4 Drawing Sheets

(51) Int. Cl.
*G01S 13/93* (2006.01)
*G01S 13/66* (2006.01)

(52) U.S. Cl.
CPC .......... *G01S 13/867* (2013.01); *G01S 13/931* (2013.01); *G01S 2013/9367* (2013.01)

(58) Field of Classification Search
USPC ...................................................... 342/70–72
See application file for complete search history.

(56) References Cited

U.S. PATENT DOCUMENTS

| | | | | |
|---|---|---|---|---|
| 6,583,403 | B1* | 6/2003 | Koike | G01S 13/931 250/221 |
| 7,376,247 | B2* | 5/2008 | Ohta | G01C 3/08 342/46 |
| 8,027,029 | B2 | 9/2011 | Lu et al. | |
| 8,350,638 | B2 | 1/2013 | White et al. | |
| 8,390,509 | B2* | 3/2013 | Asanuma | G01S 13/931 342/147 |
| 8,466,827 | B2* | 6/2013 | Nanami | B60T 7/22 342/52 |
| 8,542,106 | B2* | 9/2013 | Hilsebecher | G01S 7/412 340/435 |
| 8,610,620 | B2* | 12/2013 | Katoh | G01S 13/931 342/52 |
| 8,629,977 | B2 | 1/2014 | Phillips et al. | |
| 8,686,906 | B2 | 4/2014 | White et al. | |
| 8,704,719 | B2 | 4/2014 | Song et al. | |
| 8,907,839 | B2* | 12/2014 | Oh | G01S 15/931 342/52 |
| 8,970,397 | B2* | 3/2015 | Nitanda | G01S 17/42 340/435 |
| 9,077,072 | B2 | 7/2015 | Song et al. | |
| 2004/0178945 | A1 | 9/2004 | Buchanan | |
| 2008/0019567 | A1 | 1/2008 | Takagi et al. | |
| 2008/0077015 | A1 | 3/2008 | Boric-Lubecke et al. | |
| 2008/0260019 | A1 | 10/2008 | Aoyagi | |
| 2011/0140949 | A1 | 6/2011 | Lee | |
| 2012/0140061 | A1 | 6/2012 | Zeng | |
| 2012/0330528 | A1* | 12/2012 | Schwindt | G01S 13/52 701/96 |
| 2013/0314272 | A1* | 11/2013 | Gross | G01S 13/931 342/70 |
| 2014/0035774 | A1 | 2/2014 | Khlifi | |

FOREIGN PATENT DOCUMENTS

| | | |
|---|---|---|
| CN | 102944876 A | 2/2013 |
| DE | 4442189 A1 | 5/1996 |
| DE | 10326648 A1 | 1/2005 |
| DE | 102009054776 A1 | 8/2010 |
| DE | 102010024328 A1 | 12/2011 |

OTHER PUBLICATIONS

Amit Kumar Mishra, et al., "Information sensing for radar target classification using compressive sensing," IRS 2012, 19th International Radar Symposium, May 23-25, Warsaw, Poland, pp. 326-330.
Ming-Hua Xue, et al., "Research on Three-Dimensional Imaging Algorithm of Radar Target," Radar Science and Technology, vol. 11, No. 1, Feb. 2013, pp. 65-70.
International Searching Authority, International Search Report for PCT/US2014/45475, dated Dec. 12, 2014.
International Searching Authority, International Search Report for PCT/US2014/45471, dated Nov. 7, 2014.
International Searching Authority, International Search Report for PCT/US2014/45470, dated Nov. 7, 2014.
European Patent Office, Extended Search Report issued in European Patent Application No. 14896809.2 dated Jan. 3, 2018.
European Patent Office, Extended Search Report issued in European Patent Application No. 14896397.8 dated Dec. 15, 2017.
European Patent Office, Extended Search Report issued in European Patent Application No. 14896673.2 dated Dec. 15, 2017.
European Patent Office, Extended Search Report issued in European Patent Application No. 14896809.2 dated Apr. 19, 2018.
Translation of DE10326648 (Year: 2005).

* cited by examiner

VEHICLE RADAR METHODS AND SYSTEMS

CROSS REFERENCE TO RELATED APPLICATION

This application is a U.S. National-Stage entry under 35 U.S.C. § 371 based on International Application No. PCT/US14/45470, filed Jul. 3, 2014 which was published under PCT Article 21(2) and is incorporated in its entirety herein.

TECHNICAL FIELD

This application pertains to vehicles, and more particularly relates to methods and systems for radar systems for vehicles.

BACKGROUND

Certain vehicles today utilize radar systems. For example, certain vehicles utilize radar systems to detect other vehicles, pedestrians, or other objects on a road in which the vehicle is travelling. Radar systems may be used in this manner, for example, in implementing automatic braking systems, adaptive cruise control, and avoidance features, among other vehicle features. While radar systems are generally useful for such vehicle features, in certain situations existing radar systems may have certain limitations.

Accordingly, it is desirable to provide techniques for radar system performance in vehicles, for example pertaining to the detection and/or tracking of objects on the road in which the vehicle is travelling. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for selectively analyzing radar signals of a radar system of a vehicle. The method comprises receiving a plurality of radar signals via a radar system of a vehicle, obtaining data from one or more sensors of the vehicle having a modality that is different from the radar system, and selectively analyzing the plurality of radar signals differently based upon the data.

In accordance with an exemplary embodiment, a radar control system is provided. The radar control system comprises a receiver, an interface, and a processor. The receiver is configured to receive a plurality of radar signals of a radar system of a vehicle. The interface is configured to obtain data from one or more sensors of the vehicle having a modality that is different from the radar system. The processor is coupled to the receiver and to the interface, and is configured to selectively analyze the plurality of radar signals differently based upon the data.

In accordance with an exemplary embodiment, a vehicle is provided. The vehicle includes a radar system, one or more sensors, an interface, and a processor. The radar system includes a receiver that is configured to receive a plurality of radar signals. The one or more sensors have a modality that is different from the radar system. The interface is configured to obtain data from the one or more additional sensors. The processor is coupled to the receiver and to the interface, and is configured to selectively analyze the plurality of radar signals differently based upon the data from the one or more additional sensors.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
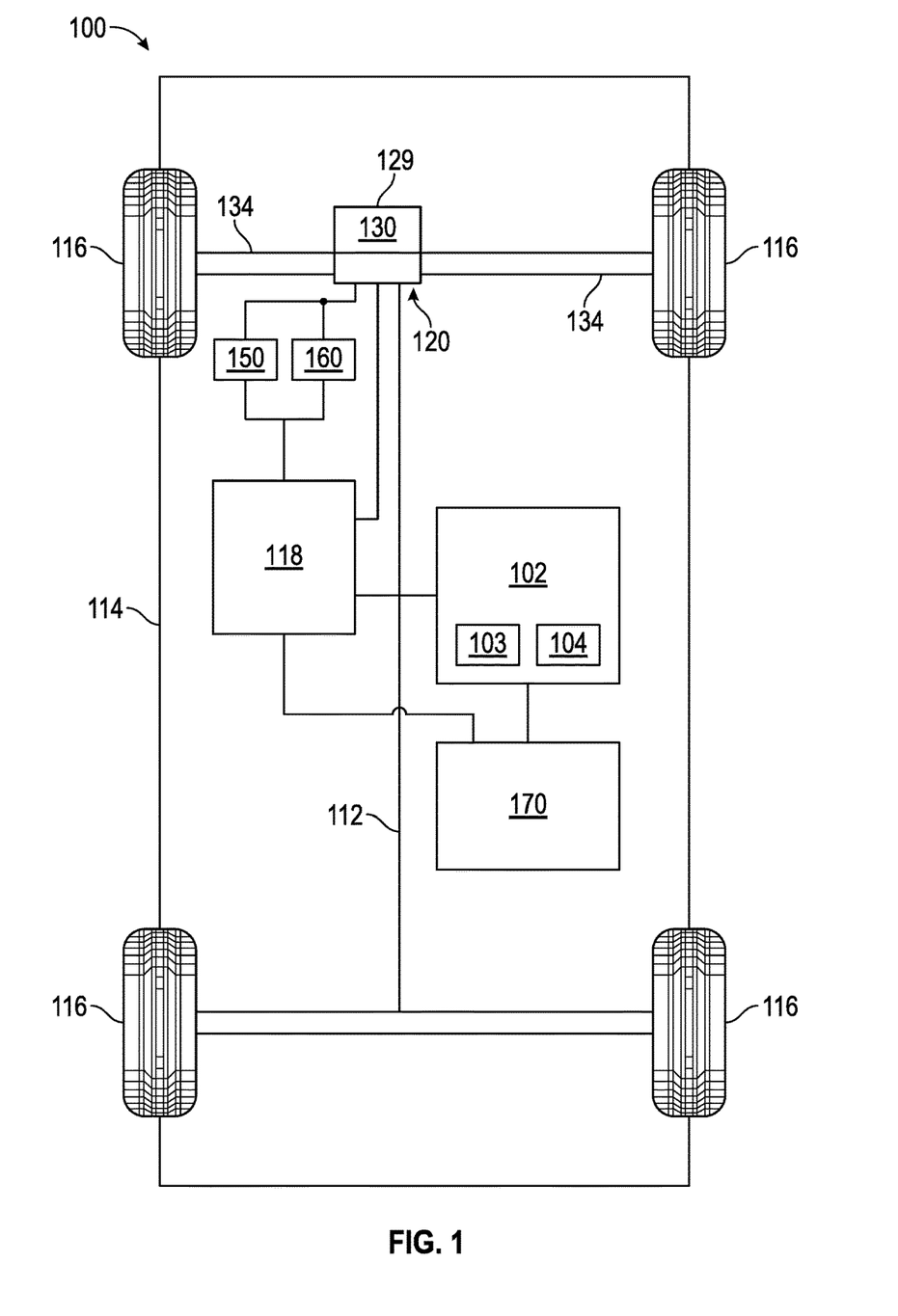
FIG. 1 is a functional block diagram of a vehicle that includes a control system including a radar system, in accordance with an exemplary embodiment.

FIG. 1 illustrates a vehicle 100, or automobile, according to an exemplary embodiment. As described in greater detail further below, the vehicle 100 includes a control system 102 for implementation of a radar system 103. In one embodiment, the control system 102 provides selective analysis of received radar signals of the radar system 103 based upon additional information provided by one or more additional sensors 104 having a different modality from the radar system 103. As discussed further below in connection with FIG. 1 as well as FIGS. 2-5, the control system 102 uses the additional information to help prevent or remedy incorrect "ghost" targets from being interpreted from the received radar signals, for example by selectively ignoring radar signals that are determined to be reflected from objects that are not on the same road in which the vehicle 100 is travelling.

With reference again to FIG. 1, the vehicle 100 includes, in addition to the above-referenced control system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

In the exemplary embodiment illustrated in FIG. 1, the vehicle 100 includes an actuator assembly. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission.

The steering system 150 is mounted on the chassis 112, and controls steering of the wheels 116. The steering system 150 includes a steering wheel and a steering column (not depicted). The steering wheel receives inputs from a driver of the vehicle. The steering column results in desired steering angles for the wheels 116 via the drive shafts 134 based on the inputs from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lightning units, navigation systems, and the like (also not depicted).

Also as depicted in FIG. 1, in certain embodiments the vehicle 100 may also include a telematics system 170. In one such embodiment the telematics system 170 is an onboard device that provides a variety of services through communication with a call center (not depicted) remote from the vehicle 100. In various embodiments the telematics system may include, among other features, various non-depicted features such as an electronic processing device, one or more types of electronic memory, a cellular chipset/component, a wireless modem, a dual mode antenna, and a navigation unit containing a GPS chipset/component. The telematics system 170 may provide various services including: turn-by-turn directions and other navigation-related services provided in conjunction with the GPS chipset/component, airbag deployment notification and other emergency or roadside assistance-related services provided in connection with various sensors and/or sensor interface modules located throughout the vehicle, and/or infotainment-related services where music, internet web pages, movies, television programs, videogames, and/or other content. In addition, in certain embodiments, GPS and emergency-related services can be used as additional inputs for the radar system.

The control system 102 is mounted on the chassis 112. As mentioned above, the control system 102 provides selective analysis of received radar signals of the radar system 103 based upon additional information provided by one or more additional sensors 104 having a different modality from the radar system 103. Specifically, in one embodiment, the control system 102 uses the additional information to help prevent incorrect "ghost" interpretations from the received radar signals, for example by selectively ignoring radar signals that are determined to be returned from objects that are not on the same road as the vehicle 100. The control system 102, in one example, provides these functions in accordance with the process 400 described further below in connection with FIGS. 4 and 5.

While the control system 102, the radar system 103, and the additional sensors 104 are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the actuator assembly 120, and/or the electronic control system 118.

Figure 2:
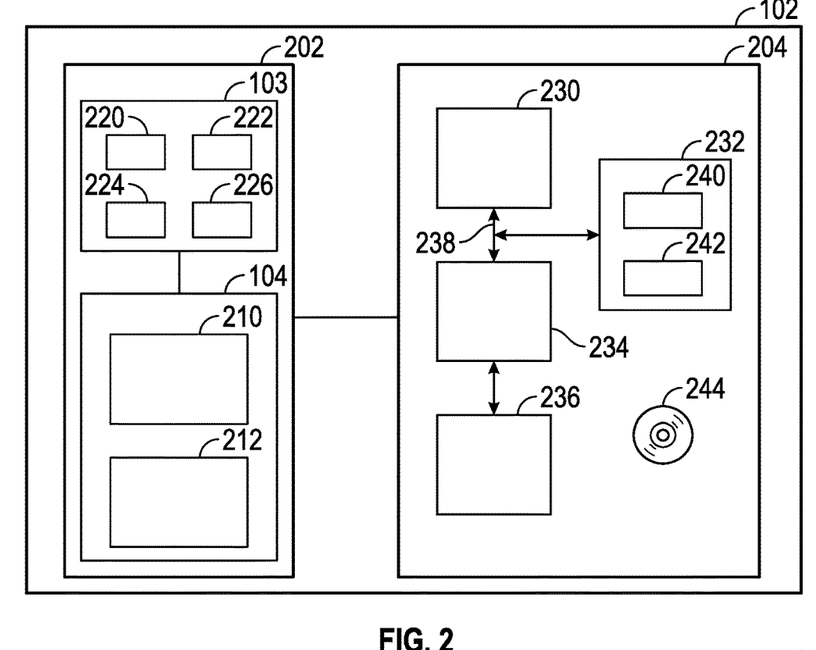
FIG. 2 is a functional block diagram of the control system of the vehicle of FIG. 1, in accordance with an exemplary embodiment.

With reference to FIG. 2, a functional block diagram is provided for the control system 102 of FIG. 1, in accordance with an exemplary embodiment. As depicted in FIG. 2, the control system 102 includes a sensor array 202 and a controller 204.

The sensor array 202 includes the radar system 103 and the one or more additional sensors 104 of FIG. 1. In the depicted embodiment, the additional sensors 104 include one or more cameras 210 and one or more light detection and ranging (LIDAR) systems 212. The camera(s) 210 and LIDAR system(s) 212 obtain respective sensor information identifying objects on or near a road in which the vehicle 100 is travelling, such as another vehicle on the road and/or a guard rail or other object alongside the road.

Also as depicted in FIG. 2, the radar system 103 includes a transmitter 220 (also referred to herein as a transmitting channel) and a receiver 222 (also referred to herein as a receiving channel). The transmitter 220 transmits radar signals from the radar system 103. After the transmitted radar signals contact one or more objects on or near a road on which the vehicle 100 is travelling and is reflected/redirected toward the radar system 103, the redirected radar signals are received by the receiver 222 of the radar system 103 for processing.

Also as depicted in FIG. 2, in certain embodiments the radar system 103 also includes, among other possible features, an interface unit 224 and a processing unit 226. The interface unit 224 receives information from the additional sensors 104 (e.g. from the one or more cameras 210 and LIDAR systems 212). The processing unit 226 processes, and selectively analyzes and interprets, the received radar signals along with the information from the additional sensors 104, in accordance with the steps of the process 400 described further below in connection with FIGS. 4 and 5. The processing unit 226 of the illustrated embodiment is capable of executing one or more programs (i.e., running software) to perform various tasks instructions encoded in the program(s).

The processing unit 226 may be a microprocessor, microcontroller, application specific integrated circuit (ASIC) or other suitable device as realized by those skilled in the art. Of course, the radar system 103 may include multiple processing unit 226, working together or separately, as is also realized by those skilled in the art. In certain embodiments, the processing unit 226 also includes or is associated with a memory (not depicted) of the radar system 103 for storing values for use in the process 400 of FIGS. 4 and 5 (e.g., angles between the host vehicle and detected objects with respect to the direction of travel of the host vehicle). In addition, it is noted that in certain embodiments, these functions may be performed in whole or in part by one or more other interfaces and processors disposed outside the radar system 103, such as the interface 234 and processor 230 of the controller 204 described further below.

As depicted in FIG. 2, the controller 204 is coupled to the radar system 103 and the additional sensors 104 of the sensor array 202. Similar to the discussion above, in certain embodiments the controller 204 may be disposed in whole or in part within or as part of the radar system 103. In addition, in certain embodiments, the controller 204 is also coupled to one or more other vehicle systems (such as the electronic control system 118 of FIG. 1). The controller 204 receives the information sensed or determined from the radar system 103 and the additional sensors 104. In addition, the controller 204 processes, and selectively analyzes and interprets, the received radar signals along with the information from the additional sensors 104. In one embodiment, the controller 204 utilizes the information from the additional sensors 104 to help prevent incorrect "ghost" interpretations from the received radar signals, for example by selectively ignoring radar signals that are determined to be returned from objects that are not on the same road as the vehicle 100. The controller 204 generally performs these functions in accordance with the steps of the process 400 discussed further below in connection with FIGS. 4 and 5.

As depicted in FIG. 2, the controller 204 comprises a computer system. In certain embodiments, the controller 204 may also include one or more of the radar system 103, additional sensor(s) 104, and/or one or more other systems. In addition, it will be appreciated that the controller 204 may otherwise differ from the embodiment depicted in FIG. 2. For example, the controller 204 may be coupled to or may otherwise utilize one or more remote computer systems and/or other control systems, such as the electronic control system 118 of FIG. 1.

In the depicted embodiment, the computer system of the controller 204 includes a processor 230, a memory 232, an interface 234, a storage device 236, and a bus 238. The processor 230 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 230 executes one or more programs 240 contained within the memory 232 and, as such, controls the general operation of the controller 204 and the computer system of the controller 204, generally in executing the steps of the processes described herein, such as the steps of the method 400 described further below in connection with FIGS. 4 and 5.

The memory 232 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 232 is located on and/or co-located on the same computer chip as the processor 230. In the depicted embodiment, the memory 232 stores the above-referenced program 240 along with one or more stored values 242 for use in making the determinations.

The bus 238 serves to transmit programs, data, status and other information or signals between the various components of the computer system of the controller 204. The interface 234 allows communication to the computer system of the controller 204, for example from a system driver and/or another computer system, and can be implemented using any suitable method and apparatus. In one embodiment, the interface 234 obtains the additional data from the additional sensors 104 (e.g., camera data from the camera 210 and LIDAR data from the LIDAR system 212) for use in selectively analyzing the received radar signals of the radar system 103. The interface 234 can include one or more network interfaces to communicate with other systems or components. The interface 234 may also include one or more network interfaces to communicate with technicians, and/or one or more storage interfaces to connect to storage apparatuses, such as the storage device 236.

The storage device 236 can be any suitable type of storage apparatus, including direct access storage devices such as hard disk drives, flash systems, floppy disk drives and optical disk drives. In one exemplary embodiment, the storage device 236 comprises a program product from which memory 232 can receive a program 240 that executes one or more embodiments of one or more processes of the present disclosure, such as the steps of the method 400 (and any sub-processes thereof) described further below in connection with FIGS. 4 and 5. In another exemplary embodiment, the program product may be directly stored in and/or otherwise accessed by the memory 232 and/or a disk (e.g., disk 244), such as that referenced below.

The bus 238 can be any suitable physical or logical means of connecting computer systems and components. This includes, but is not limited to, direct hard-wired connections, fiber optics, infrared and wireless bus technologies. During operation, the program 240 is stored in the memory 232 and executed by the processor 230.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 230) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 204 may also otherwise differ from the embodiment depicted in FIG. 2, for example in that the computer system of the controller 204 may be coupled to or may otherwise utilize one or more remote computer systems and/or other control systems.

Figure 3:
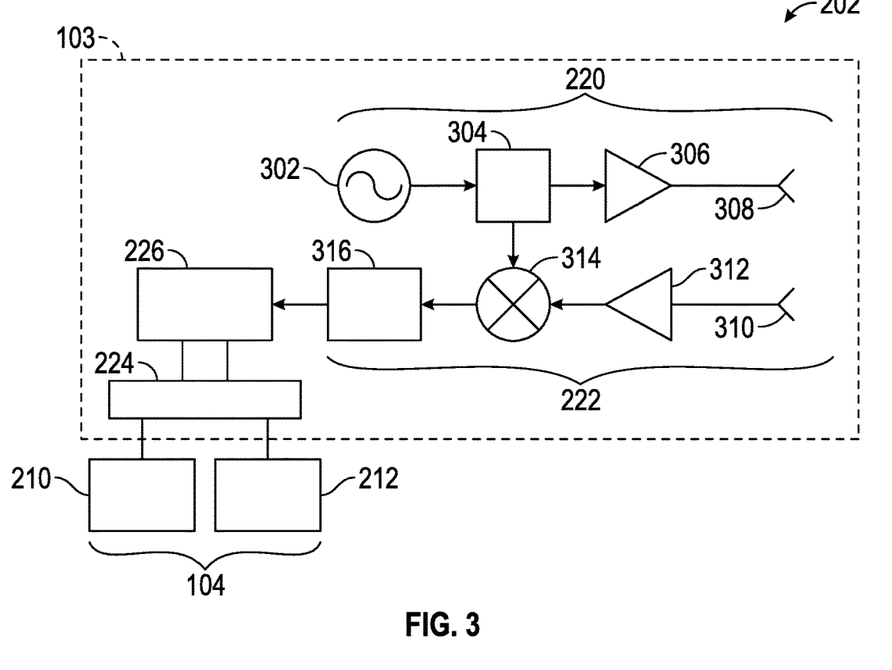
FIG. 3 is a functional block diagram of a sensor array of the control system of FIGS. 1 and 2, including the radar system, in accordance with an exemplary embodiment.

FIG. 3 is a functional block diagram of the sensor array 202 of the control system 102 of FIGS. 1 and 2, including the radar system 103 thereof, in accordance with an exemplary embodiment. Specifically, the radar system 103 of FIGS. 1 and 2 is depicted in FIG. 3 alongside additional sensors 104 of FIGS. 1 and 2, including the camera 210 and LIDAR system 212 of FIG. 2, in accordance with an exemplary embodiment.

As depicted in FIG. 3, the radar system 103 includes the transmitting channel 220, the receiving channel 222, the interface unit 224, and the processing unit 226 of FIG. 2. The transmitting channel 220 includes a signal generator 302, a filter 304, an amplifier 306, and an antenna 308. The receiving channel 222 includes an antenna 310, an amplifier 312, a mixer 314, and a sampler/digitizer 316. In certain embodiments the antennas 308, 310 may comprise as single antenna, while in other embodiments the antennas 308, 310 may comprise separate antennas. Similarly, in certain embodiments the amplifiers 306, 312 may comprise a single amplifier, while in other embodiments the amplifiers 306, 312 may comprise separate amplifiers.

The radar system 103 generates the transmittal radar signals via the signal generator 302. The transmittal radar signals are filtered via the filter 304, amplified via the amplifier 306, and transmitted from the radar system 103 (and from the vehicle 100, also referred to herein as the "host vehicle") via the antenna 308. The transmitting radar signals subsequently contact other vehicles and/or other objects on or alongside the road on which the host vehicle is travelling. After contacting the other vehicles and/or other objects, the radar signals are reflected, and travel from the other vehicles and/or other objects in various directions, including some signals returning toward the host vehicle. The radar signals returning to the host vehicle (also referred to herein as received radar signals) are received by the antenna 310, amplified by the amplifier 312, mixed by the mixer 314, and digitized by the sampler/digitizer 316. The received radar signals are then provided to the processing unit 226 for processing.

In addition to the received radar signals, the processing unit 226 also obtains additional data from the additional sensors 104 (namely, the camera 210 and the LIDAR system 212 of FIG. 2) via the interface unit 224. The processing unit 226 processes and selectively interprets the received radar signals using the additional data from the additional sensors 104. Specifically, in one embodiment, the processing unit 226 uses the additional information to help prevent incorrect "ghost" interpretations from the received radar signals, for example by selectively ignoring radar signals that are determined to be returned from objects that are not on the same road as the vehicle 100, in accordance with the steps of the method 400 described below in connection with FIGS. 4 and 5.

Figure 4:
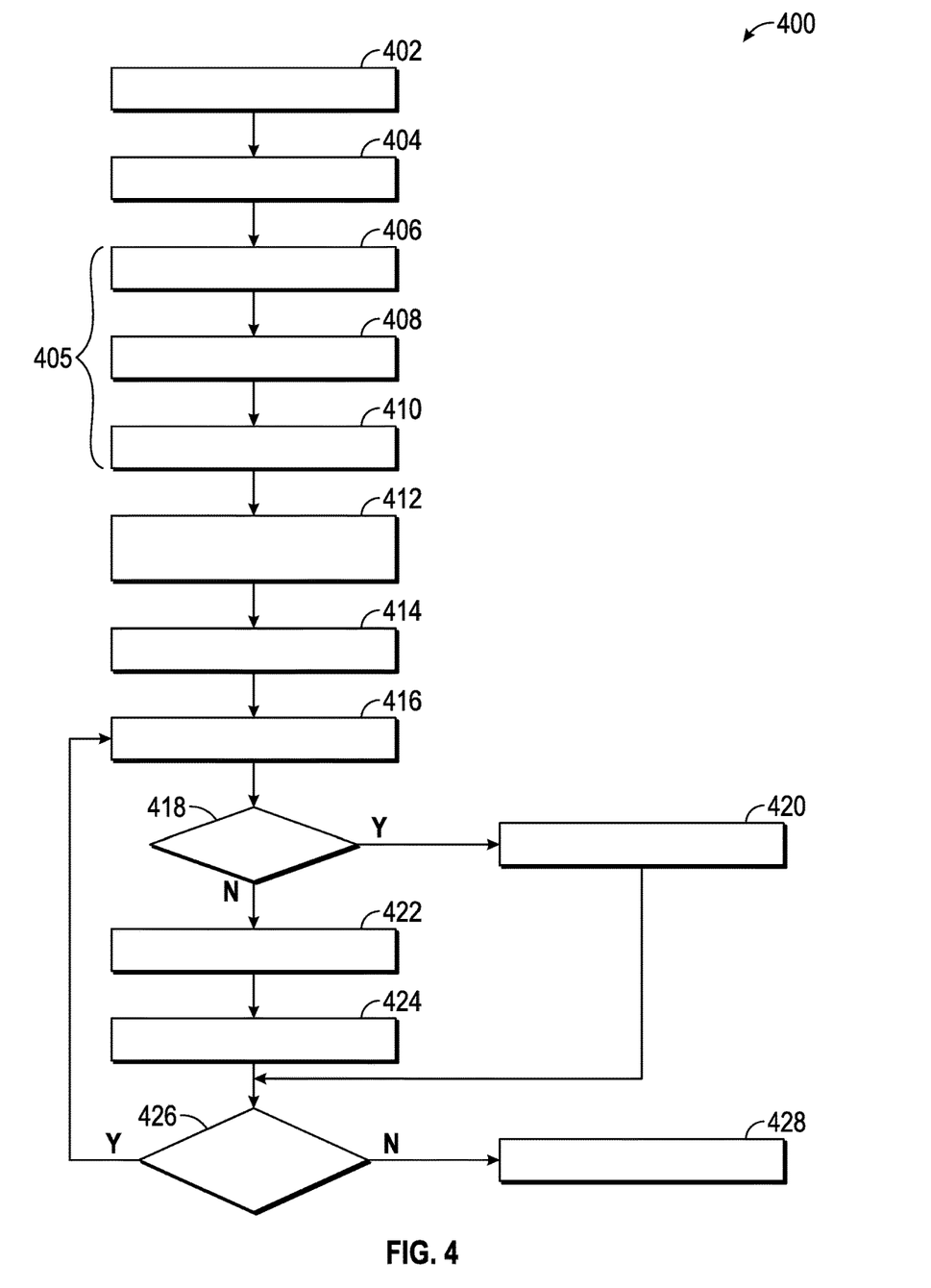
FIG. 4 is a flowchart of a method for implementing the radar system of a vehicle, which can be used in connection with the vehicle of FIG. 1, the control system of FIGS. 1 and 2, the sensor array and radar system of FIGS. 2 and 3, in accordance with an exemplary embodiment.

FIG. 4 is a flowchart of a method 400 for implementing a radar system of a vehicle, in accordance with an exemplary embodiment. The method 400 can be implemented in connection with the vehicle 100 of FIG. 1, the control system 102 of FIGS. 1 and 2, the sensor array 202 and controller 204 of FIG. 2, and the radar system 103 of FIGS. 1-3, in accordance with an exemplary embodiment. The method 400 will also be discussed in connection with FIG. 5, which provides an illustration of an implementation of the process of FIG. 4 featuring the host vehicle 100 and a target 502 vehicle disposed on the same road 500.

Figure 5:
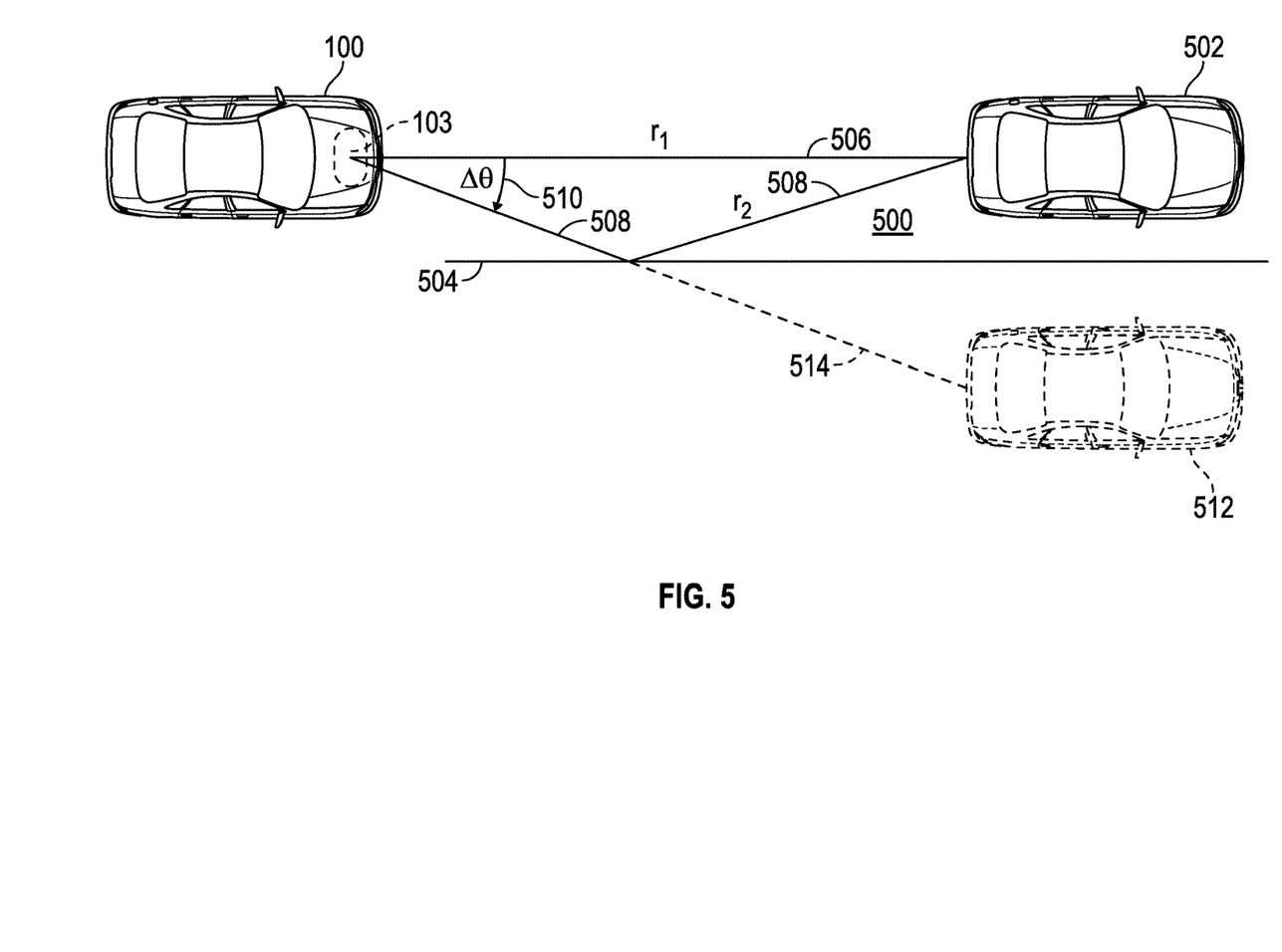
FIG. 5 is an illustration of an implementation of the method of FIG. 4 featuring a host vehicle and a target vehicle on a common road, in accordance with an exemplary embodiment.

As depicted in FIG. 4, the method 400 includes transmitting radar signals at 402. The radar signals are, in one example, transmitted via the transmitting channel 220 of the radar system 103 of the host vehicle 100 (as referenced in FIGS. 1-3). With reference to FIG. 5, the transmitted radar signals are transmitted from the host vehicle 100 as the host vehicle 100 is travelling on the road 500. Also as depicted in FIG. 5, another vehicle 502 (also referred to herein as a target or a target vehicle) is also disposed on the same road 500. In addition, the road 500 in this example includes a guard rail 504 on the side of the road 500.

After the radar signals are reflected from objects on or around the road (e.g., the target vehicle 502 and the guard rail 504 of FIG. 5), return radar signals are received by the radar system 103 at 404 of FIG. 4. In one example, the received radar signals are received via the receiving channel 222 of the radar system 103 of the host vehicle 100 (as referenced in FIGS. 1-3). During 404, the received radar signals may be received at the radar system 103 at various angles from the respective objects from which the signals had been reflected. For example, in the example of FIG. 5, first radar signals may be received by the radar system 103 of the host vehicle 100 directly from the target vehicle 502 via a first path 506 that is parallel to the path of travel of the host vehicle 100. By way of further example, second radar signals may be received by the radar system 103 of the host vehicle 100 indirectly from the target vehicle 502 along a second path 508 by being reflected off the guard rail 504 at a non-zero angle 510 with respect to the direction of travel of the host vehicle 100.

Additional data is obtained from one or more additional sensors at 405 of FIG. 4. In one example, additional data is obtained from the one or more additional sensors 104 of FIGS. 1-3, each having a different modality than the radar system 103. As used herein, a "modality" refers to the types of inputs provided/measured by the sensors (for example, cameras, LIDAR, and ultrasonic sensors each have different modalities). The additional data comprises object-level data generated by the additional sensors 104 with respect to the objects from which the received radar signals were reflected (e.g. the target vehicle 502 and the guard rail 504 of FIG. 5). As used herein, object-level data refer to object type and/or global object-level properties of the object, such as size shape, specularity, texture, and/or any other characteristic describing properties of the object as a whole. In one embodiment, 405 includes two sub-steps, namely, (i) receiving camera data from the camera 210 of FIGS. 2 and 3 pertaining to objects on or along the road from which the received radar signals were reflected at 406; and (ii) receiving LIDAR data from the LIDAR system 212 of FIGS. 2 and 3 from such objects on or along the road from which the received radar signals were reflected at 408. In certain embodiments, 405 may also include obtaining additional data from one or more other non-depicted sensors, such as ultrasonic sensor, at 410. The additional data is generally obtained via an interface, such as the interface unit 224 and/or the interface 234 of FIG. 2.

Initial determinations are made as to objects on or around the road at 412. In one embodiment, initial determinations are made as to the type of objects on or along the road, and/or the location, placement, and/or dimensions thereof, using the received radar signals and the additional information. In one embodiment, geographic coordinates and physical measurements (e.g., length, width, height) of the objects (e.g. the target vehicle 502 and the guard rail 504) are determined using the received radar signals of 404 and the additional data of 405 (e.g., using the object-level camera data of 406 and the object-level LIDAR data of 408), and are then used to determine the types of the objects that have been detected. In one embodiment, these perception tasks may be referred to as object segmentation and classification. While there may be many different approaches and algorithms to perform these tasks, in one embodiment the segmentation is based on diverse clustering methods, while classification is based on building diverse classifiers such as support vector machine (SVM)/relevance vector machines (RVM)/Ada-boost, neural networks (e.g. multi-layer perception (MLP), radial basis function (RBF), and so on). In one embodiment, more complex methods, such as Markov random field (MRF)/(conditional random field) CRF techniques, may be used to solve these two problems simultaneously.

For example, with respect to the objects from which the received radar signals were reflected en route to the host vehicle 100, the camera and LIDAR signals are used to determine whether such object is (i) a type of object that would need to be tracked by the radar system 103 (e.g. a target vehicle, a pedestrian, or an object on the road); or (ii) a type of object that could interfere with the tracking of such a tracked object (e.g. a guard rail alongside the road). In one embodiment, an object is characterized as one requiring tracking if the object is disposed on the road in a path in which the host vehicle is expected to travel (e.g. the target vehicle 502 on the road 500 in FIG. 5). Also in one embodiment, an object is characterized as one that could interfere with the tracking of the radar system 103 if the object comprises a stationary object alongside the road or otherwise not on a portion of the road in which the host vehicle 100 is travelling (e.g., the guard rail 504 alongside the road 500 of FIG. 5). By way of further example, in one embodiment, another vehicle on the side of the road may be treated differently from a guard rail (for example, the vehicle on the side of the road may still need to be tracked). By way of further example, in one embodiment, the size of the stationary object may also be a factor (e.g., a larger object may more likely need to be tracked), and so on. The determinations of 412 are performed by a processor, such as the processing unit 226 and/or the processor 230 of FIG. 2.

For each of the objects identified at 412, associated angles are also determined for such objects at 414. The associated angles generally pertain to an angle made between the host vehicle 100 and the object with respect to a direction of travel for the host vehicle 100. The associated angles are determined for each of the detected objects, including the objects that need to be tracked by the radar system 103 and the objects that could interfere with the tracking of such tracked objects by the radar system 103. The associated angles from 414 are determined by a processor, such as the processing unit 226 and/or the processor 230 of FIG. 2. The associated angles are stored in memory. In one such embodiment, the associated angles are stored in the memory 232 of FIG. 2 as stored values 242 thereof. In one embodiment, the associated angles are stored in a memory of the radar system 103 (e.g., a memory of or associated with the processing unit 226 of FIG. 2).

By way of additional explanation, LIDAR data comprises three dimensional (3D) data, so that an angle between any detected object and a LIDSA sensor is a result of direct measurement in one embodiment. Also in one embodiment, in order to obtain associated angles (between host-vehicle/ radar sensor and objects) the simple linear transformations are performed based on a calibration parameters. In one embodiment, calibration parameters may be calculated via an offline calibration procedure (during sensors installation in the vehicle, before real driving). In one embodiment, similar information can be extracted based on a single mono camera sensor only. In one embodiment, both camera and radar data are projected on the ground (homographic transformations). In one embodiment, such homographic mapping is built during the calibration procedure and assumes that the ground/road is flat. In another embodiment, three dimensional (3D) data can be creating using structure from motion (SFM) algorithms for a single monaural (mono) camera or three dimensional (3D) stereo reconstruction for multiple cameras.

Each received radar signal is then selectively analyzed, beginning with a determination of an angle for each of the radar signals received by the radar system at 416 of FIG. 4. Specifically, at 416, for each received radar signal, an angle is determined between the vehicle 100 and the object (from which the radar signal was reflected) with respect to a direction of travel of the vehicle 100. The determinations of the angles at 416 are performed by a processor, such as the processing unit 226 and/or the processor 230 of FIG. 2.

At 418 of FIG. 4, a determination is then made, with respect to a first received radar signal (or data point) under analysis, as to whether the received radar signal being analyzed corresponds to (i) an object that requires tracking by the radar system 103; or (ii) an object that is likely to interfere with tracking of a target object on the road in which the host vehicle is travelling 418. This determination is made by comparing the angle of the received radar signal at 416 with the stored angles associated with the respective objects from 414 from both the LIDAR and radar data. In one example, the respective angles of 416 and 414 are compared to determine whether the angle of the received radar signal of 416 corresponds to (i) an angle of 414 of a target object for which tracking is required; or (ii) an angle of 414 of an object that would likely interfere with tracking of a target object. In one embodiment, a determination is made at 418 as to whether or not the angle of the radar signal under analysis (as determined in 416) corresponds to an associated angle (as determined in 414) for (i) a target vehicle on the road in which the host vehicle 100 is travelling (e.g., the target vehicle 502 of FIG. 5); or (ii) a fixed object along the road (e.g., the guard rail 504 of FIG. 5) that would be likely to interfere with tracking of a target object on the road 500 of FIG. 5 (e.g., the target vehicle 502 of FIG. 5). In certain embodiments, other criteria may also be utilized (such as any inconsistency between sensors in the detected object position and its size, as well as in velocities measured by radar and estimated by the other sensor). In one embodiment, the determination of 418 is made by a processor, such as the processing unit 226 and/or the processor 230 of FIG. 2.

If it is determined at 418 of FIG. 4 that the received radar signal being analyzed corresponds to an object that could interfere with tracking (e.g. a fixed object alongside the road 500), then the radar signal being analyzed is ignored for the purposes of identifying and tracking an object on the road 500 at 420 of FIG. 4. For example, in one embodiment, if the received radar signal being analyzed is determined to be originating from the guard rail 504 of FIG. 5, then this received radar signal is ignored for identifying and tracking the object at issue (e.g., the target vehicle 502 of FIG. 5). By ignoring the signal from the guard rail 504, this helps to eliminate the creation of a ghost target 512 of FIG. 5 which could otherwise arise through evaluation of the radar signals. The determination that the received radar signal corresponds to an object that could interfere with tracking at 418, and the resulting ignoring of the data, is performed by a processor, such as the processing unit 226 and/or the processor 230 of FIG. 2. The process then proceeds to 426 (described further below), in which a determination is made as to whether there are any additional received radar signals (or data points) to be analyzed.

Conversely, if it is determined at 418 that the received radar signal being analyzed corresponds to an object that requires tracking (e.g., an object that is on the road in front of the host vehicle 100 in its present direction of travel), then the radar signal being analyzed is utilized for the purposes of identifying and tracking the object on the road at 422. For example, in one embodiment, if the received radar signal being analyzed is determined to be originating from the target vehicle 502 rather than the guard rail 504 of FIG. 5, then this received radar signal is utilized for further identification and tracking of the target vehicle 502 of FIG. 5.

In one example, the received radar signal is used, along with any previously-processed signals pertaining to the object (e.g., the target vehicle 502 of FIG. 5), to obtain additional information regarding the object on the road and to track the object over time at 424. For example, in one embodiment, the position and movement of the target vehicle 502 of FIG. 5 with respect to the host vehicle 100 is tracked over time using the data from 422 but not from 420 in various iterations over time, to thereby provide more accurate and precise tracking of the target vehicle 502 without the ghost target 512 of FIGS. 5. 420 and 422 are performed by a processor, such as the processing unit 226 and/or the processor 230 of FIG. 2. The process then proceeds to 426, described directly below.

At 426, a determination is made as to whether there are any additional received radar signals (or data points) to be analyzed. This determination is performed by a processor, such as the processing unit 226 and/or the processor 230 of FIG. 2. If there are additional received radar signals (or data points) to be analyzed, then the method repeats 416-426 for each received signal (or data point) to be analyzed.

Once each of the received radar signals (or data points) is analyzed, the tracking results of 424 are implemented at 428. Specifically, one or more vehicle actions and/or alerts may be initiated as appropriate based upon the tracking results from 424. In one example, if a distance between the host vehicle 100 and the target vehicle 502 is less than a predetermined threshold (or an estimated time of contact between the host vehicle 100 and the target vehicle 502 under their current respective trajectories is less than a predetermined threshold), then an alert (e.g., a visual or audio alert to the driver) may be provided and/or an automatic vehicle control action (e.g., automatic braking and/or automatic steering) may be initiated, for example by the processor outputting one or more control signals for the steering system 150 and/or the braking system 160 of FIG. 1. The actions initiated at 428 are initiated using a processor, such as the processing unit 226 and/or the processor 230 of FIG. 2. In addition, while 428 is depicted in FIG. 4 as being subsequent to 426 for illustrative purposes, it will be appreciated that in various embodiments one or more actions of 428 may be implemented prior to 428 (e.g. as part of or immediately subsequent to 424), so that appropriate actions may be taken in the meantime even while additional received radar signals (or data points) are being analyzed.

Accordingly, the method 400 provides for selective analysis of radar system data utilizing additional object-level data obtained from one or more additional sensors having a different modality from the radar system. Specifically, in accordance with one embodiment, the method 400 allows for potentially more accurate and/or precise tracking of an object (e.g., the target vehicle 502 of FIG. 5) on a road in which the host vehicle 100 is travelling by selectively ignoring the received radar signals reflected from other objects (e.g., the guard rail 504 of FIG. 5) that are not on the road and/or that might otherwise interfere with the tracking of the object on the road. For example, as discussed above, the method 400 can help to reduce or avoid ghost targets 512 of FIG. 5 that could otherwise be caused by the guard rail 504 of FIG. 5.

It will be appreciated that the disclosed methods, systems, and vehicles may vary from those depicted in the Figures and described herein. For example, the vehicle 100, the control system 102, the radar system 103, the additional sensors 104, the sensor array 202, the controller 204, and/or various components thereof may vary from that depicted in FIGS. 1-3 and described in connection therewith. In addition, it will be appreciated that certain steps of the method 400 may vary from those depicted in FIGS. 4 and 5 and/or described above in connection therewith. It will similarly be appreciated that certain steps of the method described above may occur simultaneously or in a different order than that depicted in FIGS. 4 and 5 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method for selectively analyzing radar signals of a radar system of a vehicle, the method comprising the steps of:
   receiving, via a receiver, a plurality of radar signals via the radar system as the vehicle is travelling along a road;
   obtaining first object data as to a plurality of objects in proximity to the road, as the vehicle is travelling along the road, from one or more first sensors of the vehicle having a first modality that is different from the radar system;
   obtaining second object data as to the plurality of objects in proximity to the road, as the vehicle is travelling along the road, from one or more second sensors of the vehicle having a second modality that is different from the first modality and also different from the radar system;
   for each of the plurality of objects:
      identifying, via a processor, a type of the object via the one or more first sensors;
      determining, via the processor, based on the type, whether the object is an object that requires tracking; and
      identifying, via the processor a first angle between the vehicle and a fixed object alongside the road using the second object-level data obtained via the one or more second sensors; and
   selectively analyzing, via the processor, the plurality of radar signals based upon the data from the one or more first sensors and the one or more second sensors, wherein the selective analyzing comprises, for each particular radar signal of the plurality radar signals:
      determining, via the processor, a second angle from which the particular radar signal was reflected to the vehicle;
      identifying, via the processor, a particular object of the plurality of objects, corresponding to the particular radar signal, based on a comparison of the second angle with each of the first angles for the plurality of objects;
      selectively utilizing, via the processor, the particular radar signal for tracking, when the identified particular object corresponding to the particular radar signal has been determined to require tracking based on its type; and
      selectively ignoring, via the processor, the particular radar signal for tracking, when the identified particular object corresponding to the particular radar signal has been determined to not require tracking based on its type.

2. The method of claim 1, further comprising:
   identifying, based on the first object data and the second object data, a target on the road that requires tracking by the vehicle;
   wherein, for each of the plurality of objects, the step of determining whether the object requires tracking is based on wherein the is likely to interfere with tracking of the target, based on the type of the object, using the first object data and the second object data;

wherein the selective analyzing further comprises tracking the target on the road by analyzing the plurality of radar signals, except for those reflected from an object that is likely to interfere with tracking of the target.

3. The method of claim 1, wherein the receiving the plurality of radar signals, obtaining the data, and selectively analyzing the plurality of radar signals are each performed within the radar system.

4. The method of claim 1, wherein the obtaining the first object data comprises obtaining the data from a camera of the vehicle.

5. The method of claim 1, wherein the obtaining the second object data comprises obtaining the data from a LIDAR system of the vehicle.

6. A radar control system comprising:
a receiver configured to receive a plurality of radar signals of a radar system of a vehicle as the vehicle is travelling along a road;
an interface configured to obtain:
first object data as to a plurality of objects in proximity to the road, as the vehicle is travelling along the road, from one or more first sensors of the vehicle having a first modality that is different from the radar system; and
second object data as to the plurality of objects in proximity to the road, as the vehicle is travelling along the road, from one or more second sensors of the vehicle having a second modality that is different from the first modality and also different from the radar system;
a processor coupled to the receiver and to the interface and configured to:
for each of the plurality of objects:
identify a type of the object via the one or more first sensors;
determine, based on the type, whether the object is an object that requires tracking; and
identify a first angle between the vehicle and a fixed object alongside the road using the second object-level data obtained via the one or more second sensors; and
selectively analyze the plurality of radar signals based upon the data received from the one or more first sensors and the one or more second sensors, by, for each particular radar signal of the plurality radar signals:
determining a second angle from which the particular radar signal was reflected to the vehicle;
identifying a particular object of the plurality of objects, corresponding to the particular radar signal, based on a comparison of the second angle with each of the first angles for the plurality of objects;
selectively utilizing the particular radar signal for tracking, when the identified particular object corresponding to the particular radar signal has been determined to require tracking based on its type; and
selectively ignoring the particular radar signal for tracking, when the identified particular object corresponding to the particular radar signal has been determined to not require tracking based on its type.

7. The radar control system of claim 5, wherein the processor is configured to:

identify, based on the first object data and the second object data, a target on the road that requires tracking by the vehicle;
for each of the plurality of objects, determine whether the object requires tracking is based on wherein the object is likely to interfere with tracking of the target, based on the type of the object, using the first object data and the second object data; and
track the target on the road by analyzing the plurality of radar signals, except for those reflected from objects that are likely to interfere with tracking of the target.

8. The radar control system of claim 5, wherein the interface is configured to obtain the first object data from a camera of the vehicle and to obtain the second object data from sensors of a LIDAR system of the vehicle.

9. A vehicle, comprising:
a radar system comprising a receiver configured to receive a plurality of radar signals as the vehicle is travelling along a road;
one or more first sensors disposed on or within the body and having a first modality that is different from the radar system, the one or more first sensors configured to generate first object data as to a plurality of objects in proximity to the road, as the vehicle is travelling along the road;
one or more second sensors disposed on or within the body and having a second modality that is different from the radar system and that is also different from the first modality, the one or more second sensors configured to generate second object data as to the plurality of objects in proximity to the road, as the vehicle is travelling along the road;
an interface configured to obtain the first object data from the one or more first sensors and to obtain the second object data from the one or more second sensors; and
a processor coupled to the receiver and to the interface and configured to:
for each of the plurality of objects:
identify a type of the object via the one or more first sensors;
determine, based on the type, whether the object is an object that requires tracking; and
identify a first angle between the vehicle and a fixed object alongside the road using the second object-level data obtained via the one or more second sensors; and
selectively analyze the plurality of radar signals based upon the data received from the one or more first sensors and the one or more second sensors, by, for each particular radar signal of the plurality radar signals:
determining a second angle from which the particular radar signal was reflected to the vehicle;
identifying a particular object of the plurality of objects, corresponding to the particular radar signal, based on a comparison of the second angle with each of the first angles for the plurality of objects;
selectively utilizing the particular radar signal for tracking, when the identified particular object corresponding to the particular radar signal has been determined to require tracking based on its type; and
selectively ignoring the particular radar signal for tracking, when the identified particular object corresponding to the particular radar signal has been determined to not require tracking based on its type.

10. The vehicle of claim 9, wherein the processor is configured to:
   identify, based on the first object data and the second object data, a target on the road that requires tracking by the vehicle;
   for each of the plurality of objects, determine whether the object requires tracking is based on wherein the object is likely to interfere with tracking of the target, based on the type of the object, using the first object data and the second object data; and
   track the target on the road by analyzing the plurality of radar signals, except for those reflected from objects that are likely to interfere with tracking the target.

11. The vehicle of claim 9, wherein:
   the one or more first sensors comprises a camera of the vehicle; and
   the one or more second sensors comprise sensors from a LIDAR system of the vehicle.

12. The method of claim 1, wherein the step of determining whether the object requires tracking is based upon whether the object comprises another vehicle.

13. The method of claim 1, wherein the step of determining whether the object requires tracking is based upon whether the object is moving.

14. The method of claim 1, wherein the step of determining whether the object requires tracking is based upon whether the object is disposed within a path in which the vehicle is moving.

15. The method of claim 2, wherein the step of determining whether the object requires tracking is based upon whether the object is determined to be likely to create a ghost target with respect to the target that is being tracked.

16. The method of claim 2, wherein the step of determining whether the object requires tracking is based on each of the following:
   whether the object is another vehicle;
   whether the object is moving;
   whether the object is disposed within a path in which the vehicle is moving; and
   whether the object is determined to be likely to create a ghost target with respect to the target that is being tracked.

17. The method of claim 1, wherein:
   the one or more first sensors comprise a camera that is configured to generate the first object data; and
   the one or more second sensors comprise sensors from a LIDAR system of the vehicle that are configured to generate the second object data.

18. The radar control system of claim 7, wherein the processor is configured to determine whether the object requires tracking based upon whether the object is determined to be likely to create a ghost target with respect to the target that is being tracked.

19. The vehicle of claim 10, wherein the processor is configured to determine whether the object requires tracking based upon whether the object is determined to be likely to create a ghost target with respect to the target that is being tracked.

20. The vehicle of claim 10, wherein the processor is configured to determine whether the object requires tracking based upon each of the following:
   whether the object is another vehicle;
   whether the object is moving;
   whether the object is disposed within a path in which the vehicle is moving; and
   whether the object is determined to be likely to create a ghost target with respect to the target that is being tracked.

* * * * *